(12) United States Patent
Wang

(10) Patent No.: US 9,162,614 B1
(45) Date of Patent: Oct. 20, 2015

(54) ILLUMINATED RUNNING BOARD FOR VEHICLE

(71) Applicant: Desity Traffic Ind Co., Ltd., Tainan (TW)

(72) Inventor: Chun-Chieh Wang, Tainan (TW)

(73) Assignee: Desity Traffic Ind Co., Ltd., Tainan (TW)

( * ) Notice: Subject to any disclaimer, the term of this patent is extended or adjusted under 35 U.S.C. 154(b) by 0 days.

(21) Appl. No.: 14/341,876

(22) Filed: Jul. 28, 2014

(30) Foreign Application Priority Data

May 28, 2014 (TW) .............................. 103209388 U

(51) Int. Cl.
*B60Q 1/32* (2006.01)
*F21V 8/00* (2006.01)
*F21W 101/02* (2006.01)
*F21W 101/00* (2006.01)

(52) U.S. Cl.
CPC .............. *B60Q 1/323* (2013.01); *G02B 6/0096* (2013.01); *F21W 2101/00* (2013.01); *F21W 2101/02* (2013.01)

(58) Field of Classification Search
CPC .......... F21W 2101/02; F21W 2101/00; B60Q 1/323
USPC .................................................. 362/481, 495
See application file for complete search history.

(56) References Cited

U.S. PATENT DOCUMENTS

| 958,542 | A | * | 5/1910 | Ricketts | 362/481 |
|---|---|---|---|---|---|
| 6,889,456 | B2 | * | 5/2005 | Shibata et al. | 40/546 |
| 7,712,933 | B2 | * | 5/2010 | Fleischmann et al. | 362/511 |
| 7,901,120 | B2 | * | 3/2011 | Droste et al. | 362/509 |
| 8,235,568 | B2 | * | 8/2012 | Heiden et al. | 362/495 |
| 8,770,812 | B2 | * | 7/2014 | Kino et al. | 362/559 |
| 9,022,631 | B2 | * | 5/2015 | Mulder et al. | 362/609 |
| 2005/0213351 | A1 | * | 9/2005 | Yang | 362/633 |

* cited by examiner

*Primary Examiner* — Anabel Ton
(74) *Attorney, Agent, or Firm* — Alan D. Kamrath; Kamrath IP Lawfirm, P.A.

(57) ABSTRACT

An illuminated running board for a vehicle includes a running board body and at least one light-emitting device installed in the running board body. The running board body includes two lateral ends and an outer end portion extending between the lateral ends. The light-emitting device includes a light guide bar and at least one illuminant. The light guide bar is held inside the outer end portion and includes a plane facing the outer end portion for development of a luminous surface. The illuminant is adjacent to an end face of the light guide bar and projects light rays which are guided into the light guide bar through the end face and emitted from the outer end portion, so that the running board can be clearly observed by passengers and other vehicle drivers for better security of the running board in service.

13 Claims, 7 Drawing Sheets

ILLUMINATED RUNNING BOARD FOR VEHICLE

BACKGROUND OF THE INVENTION

The present invention relates to a running board and, more particularly, to an illuminated running board adapted to be installed on a vehicle's lateral side.

In general, a vehicle with a large height (e.g., a support utility vehicle, van, etc.) is laterally provided with running boards on which passengers tread to get on or off the vehicle. For improved security of passengers getting on or off a vehicle, light-emitting devices have been installed in running boards of some vehicles. When a vehicle is parked or a car door is opened, an illuminant (consisting of light emitting diodes) in the light-emitting device is activated and projects light rays on a top of the running board which can be treaded by a passenger.

However, a passenger to get on or off a vehicle may stumble his/her leg against a running board and be hurt, because light rays projected on the top of the running board are not spread to the ground on which the vehicle is parked or because a parking lot provides insufficient lighting at night. In addition, a protruded running board of a parked vehicle is difficult to observe and collided with accidentally by other running vehicles. Moreover, a conventional illuminated running board, which is not known for its sealing, allows moisture to permeate inside and damage any light-emitting device.

BRIEF SUMMARY OF THE INVENTION

It is an objective of the present invention to provide an illuminated running board for a vehicle which can be clearly observed by a passenger or other vehicle drivers through light rays from the illuminated running board for better security of the running board in service when the vehicle has been parked. Furthermore, the illuminated running board is characteristic of good sealing, waterproof effect, and extended service life.

To achieve this and other objectives, an illuminated running board for a vehicle of the present invention includes a running board body and a light-emitting device. The running board body is adapted to be installed on a vehicle's lateral side and includes a top extending in a longitudinal direction of the running board body. The running board body further includes two lateral ends spaced in the longitudinal direction and an outer end portion extending in the longitudinal direction and between the two lateral ends. The outer end portion is extended downward from the top, and an accommodation space is formed inside the outer end portion and extends in the longitudinal direction. The light-emitting device is installed inside the running board body and includes at least one light guide bar and at least one illuminant. The light guide bar is held in the accommodation space of the running board body and has a first plane and a second plane opposite to the first plane. The first plane faces the outer end portion to form a luminous surface. The light guide bar includes two lateral ends spaced in the longitudinal direction. The illuminant is adjacent to an end face of at least one lateral end of the light guide bar and projects light rays which are guided into the light guide bar through the end face and emitted from the outer end portion of the running board body.

In an embodiment, the second plane is integrated with a reflective piece for development of a reflecting surface. The outer end portion is provided with an opening extending therethrough and being in communication with the accommodation space. At least one joint groove is defined inside the outer end portion and spaced from the accommodation space. The illuminant is held in an illuminant holder and includes at least one salient portion formed at a lateral end of illuminant holder and correspondingly inserted into the joint groove in the running board body. The light-emitting device further includes a transparent tubing which covers peripheries of the light guide bar and the reflective piece.

The present invention will become clearer in light of the following detailed description of illustrative embodiments of this invention described in connection with the drawings.

DETAILED DESCRIPTION OF THE INVENTION

Figure 1:
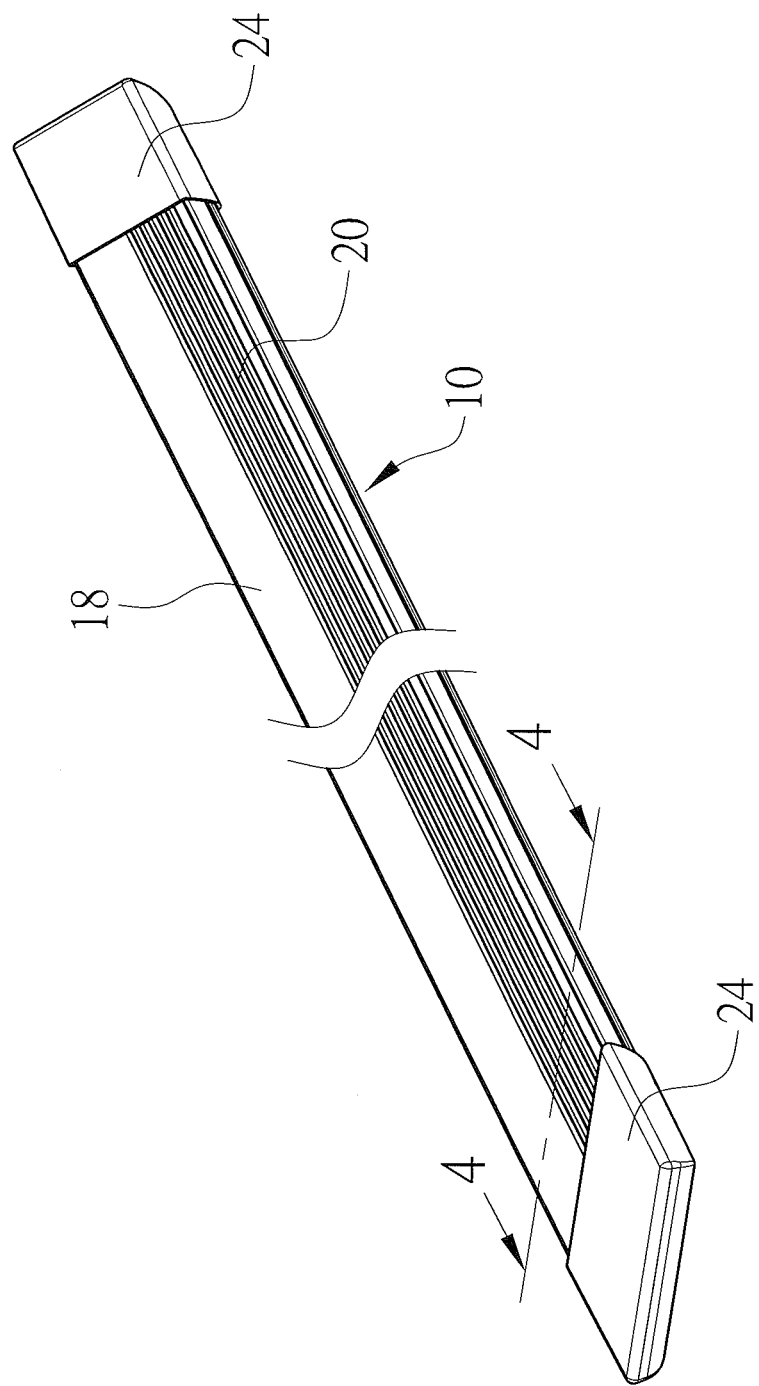
FIG. 1 is a perspective view of an illuminated running board for a vehicle according to an embodiment of the present invention.
Figure 2:
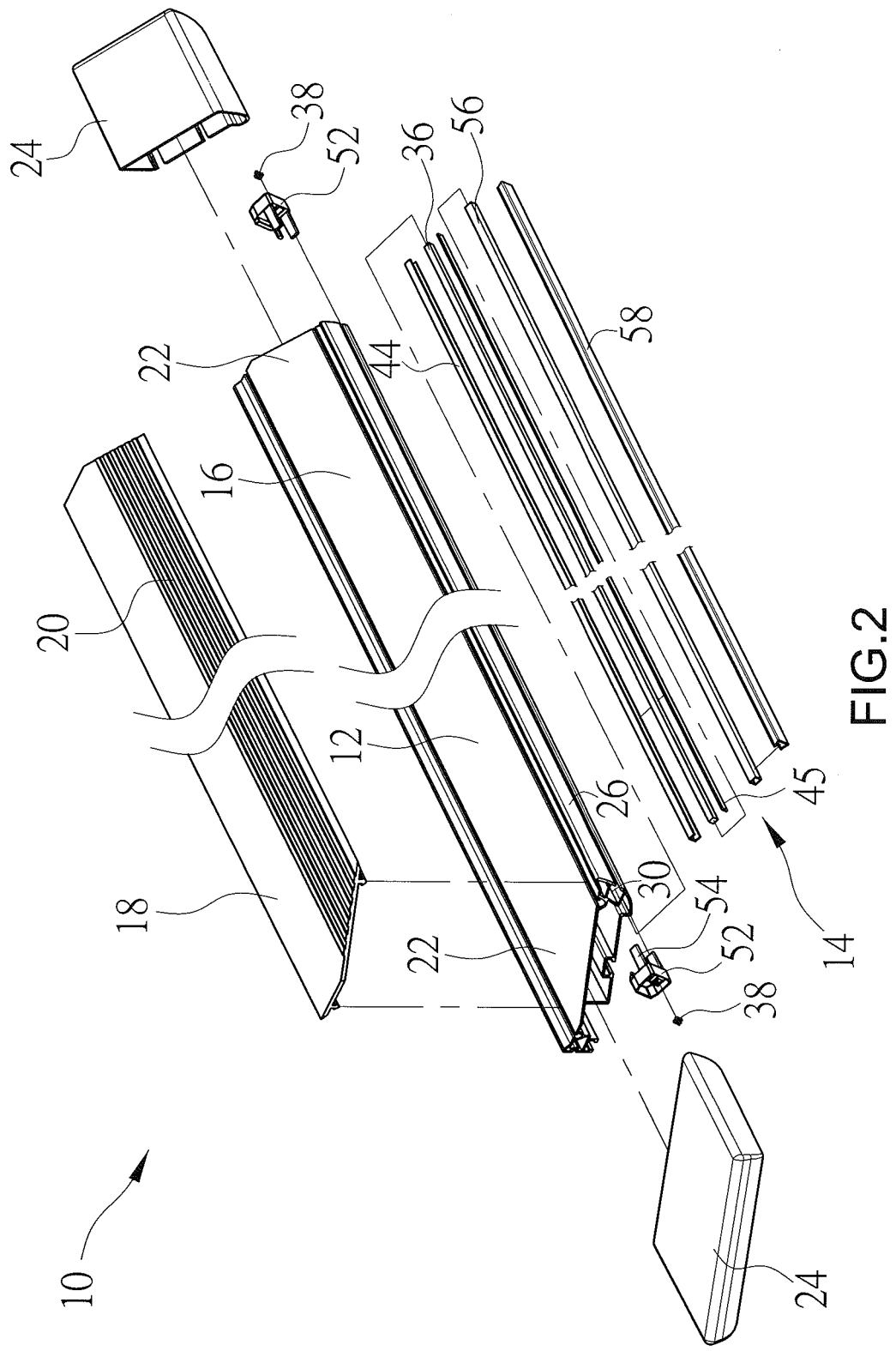
FIG. 2 is an exploded view of the illuminated running board of FIG. 1.
Figure 3:
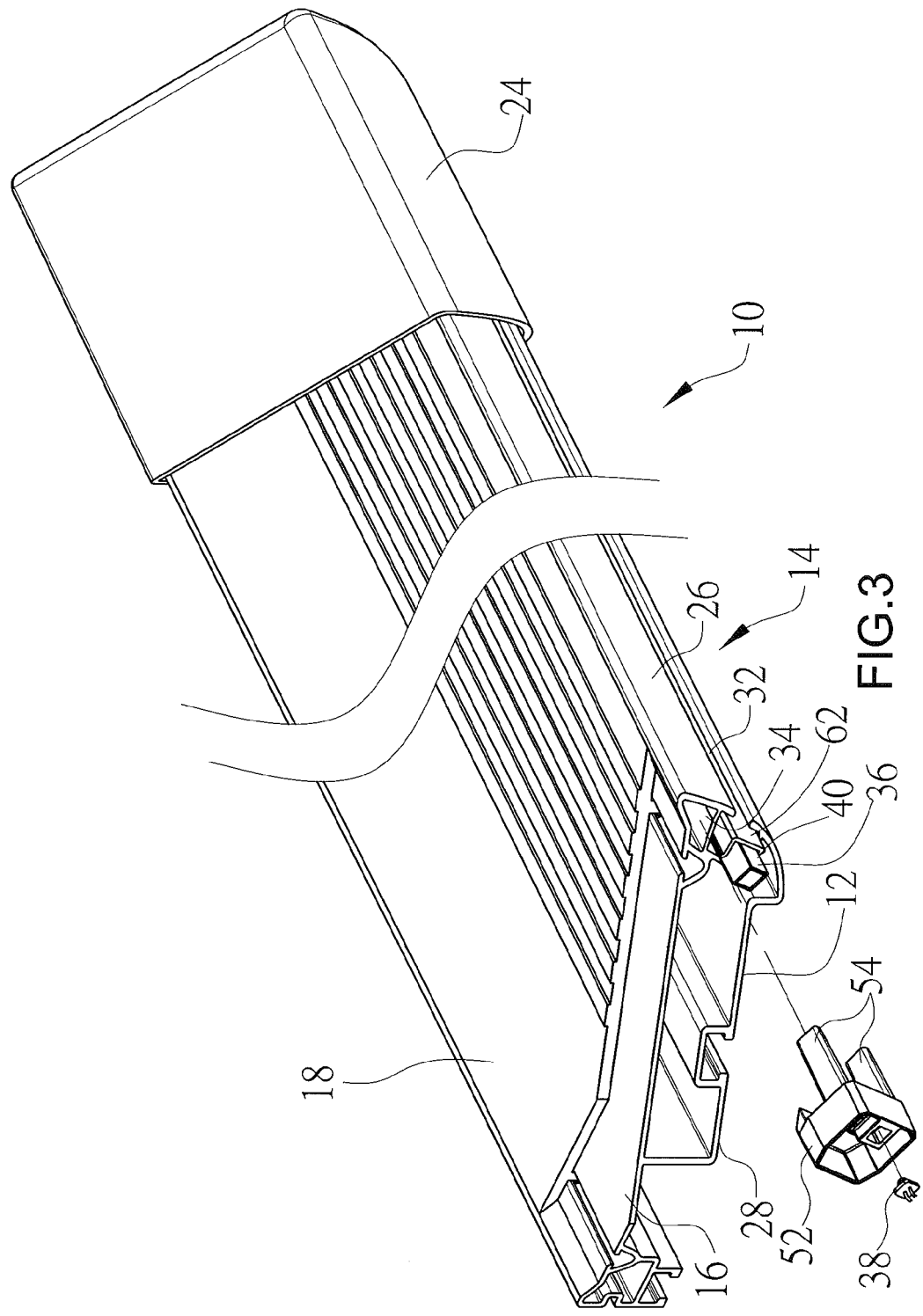
FIG. 3 is a schematic view illustrating the illuminated running board of FIG. 1 with a side cap removed.
Figure 4:
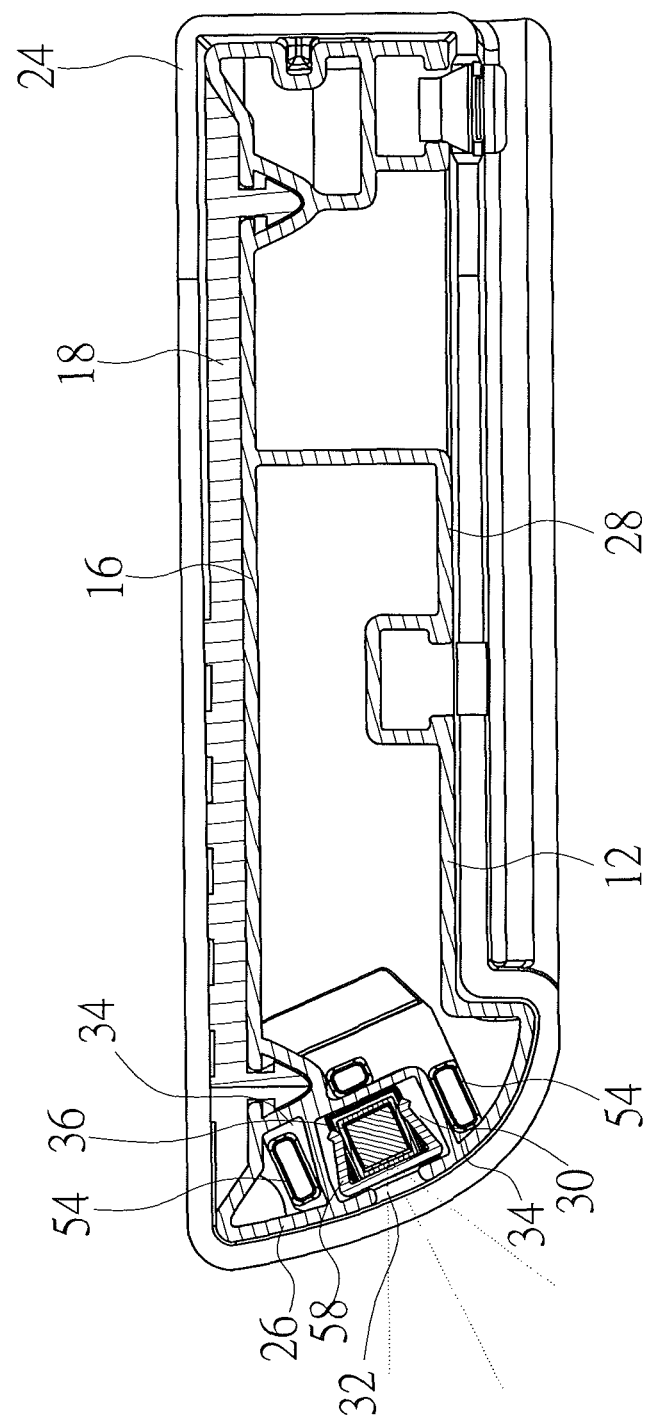
FIG. 4 is a sectional view taken along line 4-4 of FIG. 1.
Figure 5:
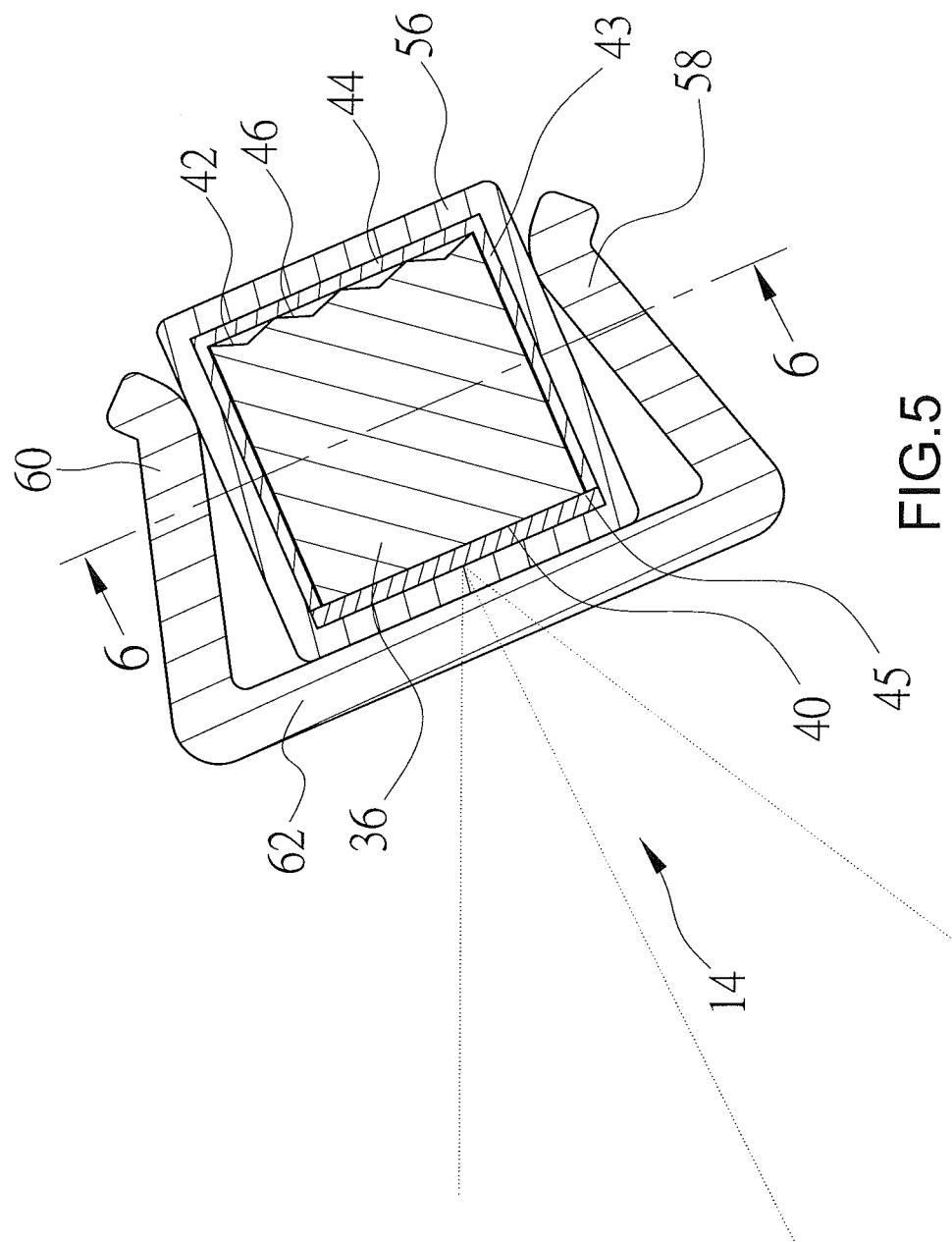
FIG. 5 is a sectional view illustrating a light-emitting device of the illuminated running board of FIG. 1.
Figure 6:
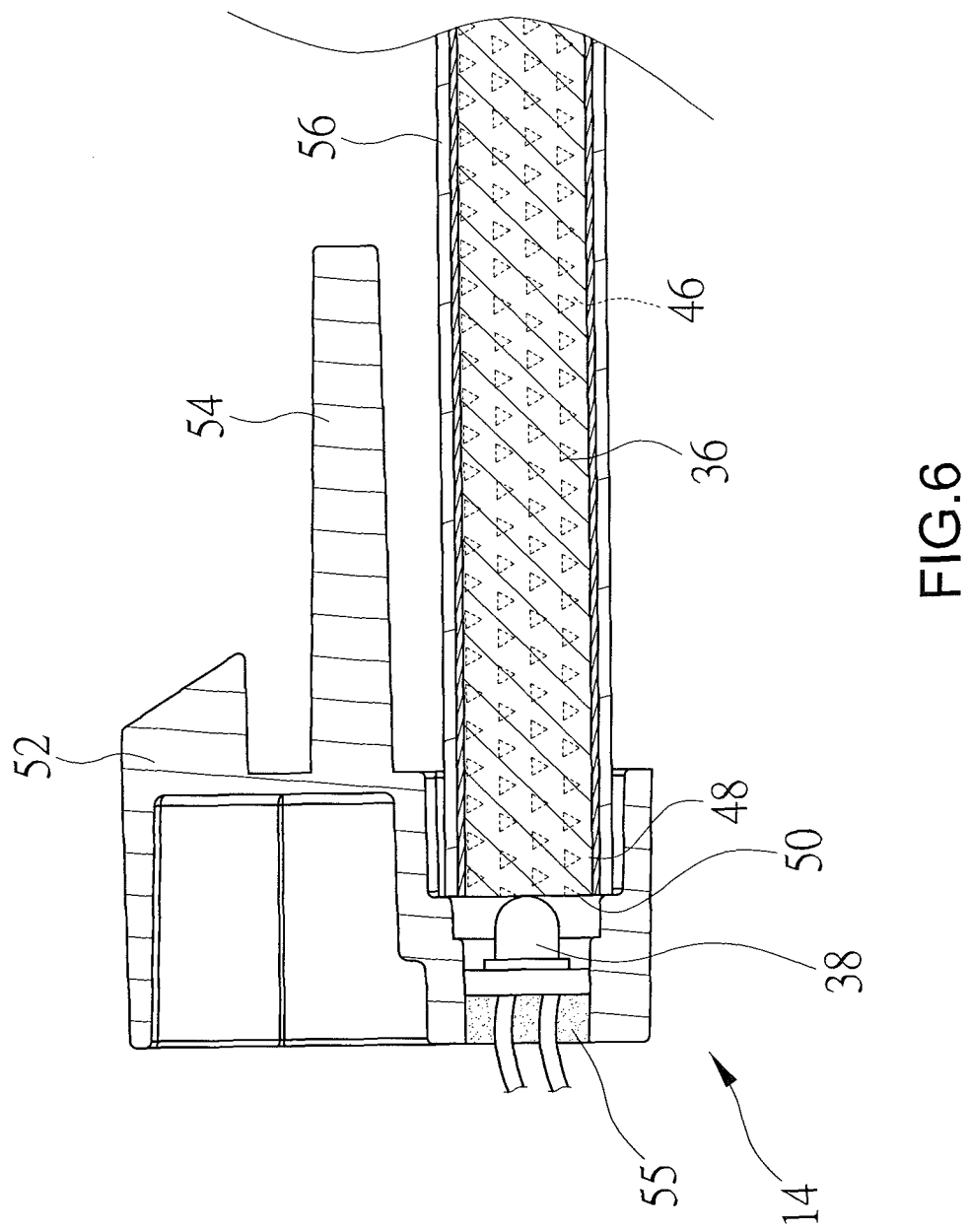
FIG. 6 is a sectional view taken along line 6-6 of FIG. 5.

An illuminated running board for a vehicle according to an embodiment of the present invention is shown in FIGS. 1 through 6 of the drawings and generally designated 10. The illuminated running board 10 includes a running board body 12 and a light-emitting device 14. The running board body 12 is adapted to be installed on a vehicle's lateral side. In this embodiment, the running board body 12 is a metallic frame made of aluminum alloy and includes a top 16 extending in a longitudinal direction of the running board body 12. A cover plate 18 is engaged on an upper surface of the top 16 and provided with a plurality of non-skid grooves 20 thereon. The running board body 12 further includes two lateral ends 22 spaced in the longitudinal direction, and each lateral end 22 is covered with a side cap 24 for combining the cover plate 18 and the running board body 12 when the cover plate 18 is mounted on the top 16.

The miming board body 12 further includes an outer end portion 26 extending in the longitudinal direction and between the two lateral ends 22. The outer end portion 26 faces an outer side of the vehicle when the running board body 12 is installed on the vehicle. The outer end portion 26 is extended downward from an outer end of the top 16 and develops an inwardly curved shape (see FIG. 4). A bottom 28 extends inward from a lower end of the outer end portion 26 and is opposite to and spaced from the top 16. An accommodation space 30 is formed inside the outer end portion 26 and extends in the longitudinal direction. The outer end portion 26 is provided with an opening 32 extending through the outer end portion 26 and in communication with the accommodation space 30. The opening 32 may be replaced by a plurality of through-holes spaced in the longitudinal direction. Furthermore, a plurality of joint grooves 34 is defined inside the outer end portion 26 and spaced from the accommodation space 30.

Figure 7:
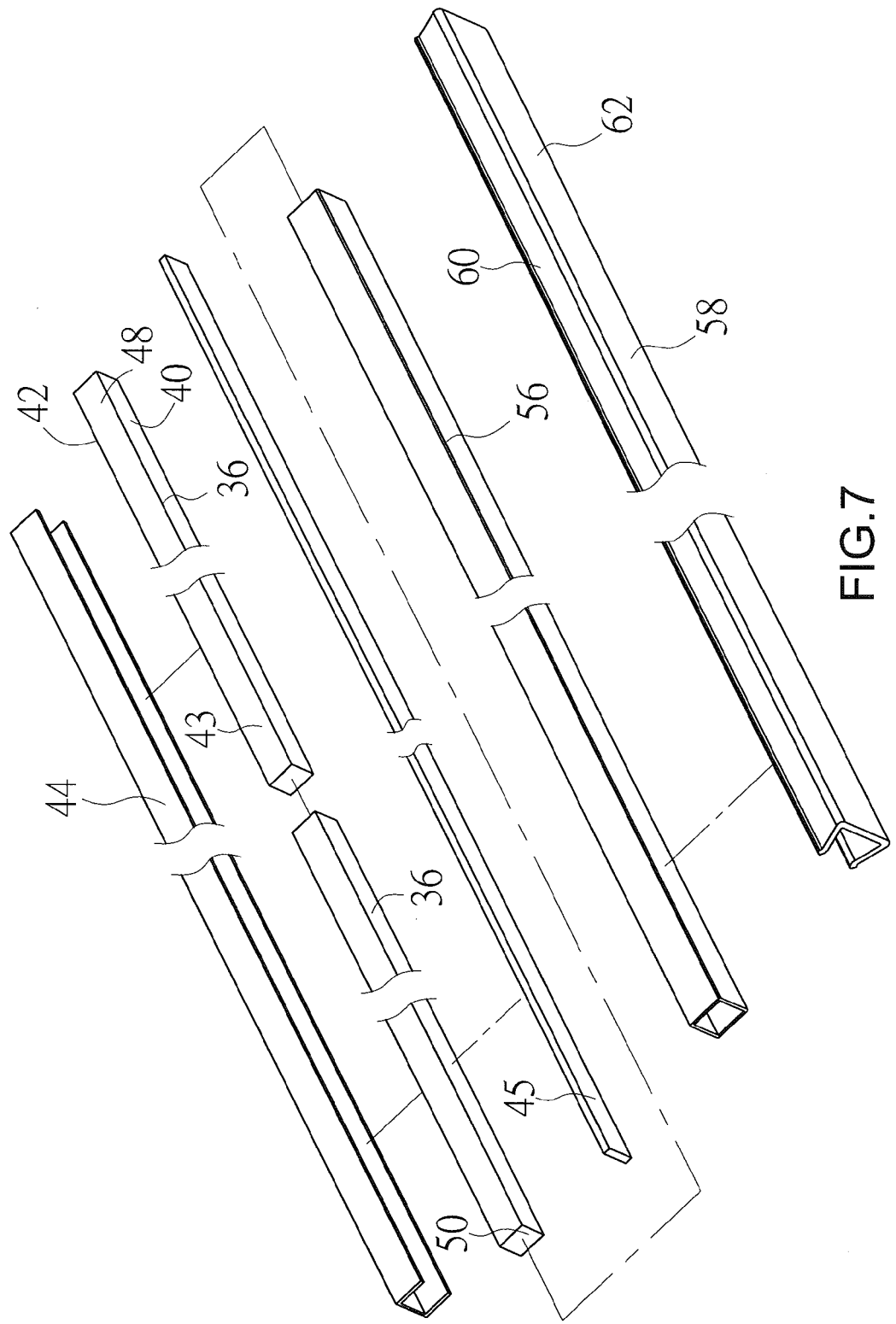
FIG. 7 is an exploded view illustrating a light-emitting device according to another embodiment of the present invention.

The light-emitting device 14 is installed in the running board body 12 and includes at least one light guide bar 36 and at least one illuminant 38. In this embodiment, the light-emitting device 14 includes a light guide bar 36 which is held in the accommodation space 30 of the running board body 12 and has a first plane 40 facing the outer end portion 26 and a second plane 42 opposite to the first plane 40. In this embodiment, the first plane 40 faces the opening 32 of the outer end portion 26 and is formed as a luminous surface. A U-shaped reflective piece 44, such as an optical reflection film or reflection sheet, is engaged on the second plane 42 and two side planes 43 of the light guide bar 36 for development of a reflecting surface with excellent effect of the optical reflection (see FIG. 5). The side planes 43 of the light guide bar 36 extend between the first and second planes 40 and 42 respectively. Furthermore, the first plane 40 is provided with an optical diffusion film 45, and the second plane 42 is provided with a micro-structure 46 consisting of geometric dots for better uniformity of luminance. Further, the light guide bar 36 includes two lateral ends 48, with each of which having an end face 50 adjacent to an associated illuminant 38 for development of an incident plane at the end face 50 (see FIG. 6). As shown in another embodiment in FIG. 7, the light-emitting device 14 includes two light guide bars 36 adjacent to each other.

In this embodiment, the light-emitting device 14 includes two illuminants 38 which consist of light emitting diodes (LEDs) electrically connected to a car battery, so that radiation from the illuminants 38 is controllably guided into the light guide bar 36 via the end faces 50 of the light guide bar 36 respectively. In an alternative embodiment, the light-emitting device 14 includes only one illuminant 38 which is closed to one of the lateral ends 48 of the light guide bar 36.

In this embodiment, each illuminant 38 can be truly held and positioned in an illuminant holder 52 which is securely mounted in a corresponding lateral end 22 of the running board body 12 with a plurality of salient portions 54 designed at one lateral end of the illuminant holder 52 and correspondingly inserted into the joint grooves 34 inside the running board body 12. In this embodiment, the illuminant holder 52 made of silicone is internally provided with thermal conductivity glue 55 (see FIG. 6) or heat sinks for sealing an outer side opening of the illuminant holder 52. The thermal conductivity glue 55 contributes to thermal dissipation of the LED illuminants 38 and tightness of the illuminant holder 52 and the running board body 12 without permeation of moisture.

The light-emitting device 14 further includes a transparent heat-shrinkable tubing 56 which covers peripheries of the light guide bar 36 and the reflective piece 44 to prevent the light-emitting device 14 from permeation of moisture and to ensure that the reflective piece 44 and optical diffusion film 45 can be tightly attached to the light guide bar 36. The light-emitting device 14 further includes a translucent clamping body 58 having two clip arms 60 and a joint portion 62 connecting the clip arms 60. The clip arms 60 are used to clamp the tubing 56, and the joint portion 62 is located between the first plane 40 of the light guide bar 36 and the opening 32 of the outer end portion 26 for secure installation of the light-emitting device 14 inside the running board body 12.

In the implementation of the illuminated running board 10, light rays out of the illuminants 38 are projected into the light guide bar 36 through the end faces 50 of the light guide bar 36, reflected by the reflective piece 44, and emitted from the first plane 40 of the light guide bar 36. The illuminated running board 10 protruded on a parked vehicle can be clearly observed by passengers and other drivers in running vehicles when light rays out of the first plane 40 are emitted through the transparent tubing 56, the translucent clamping body 58 and the opening 32 in the outer end portion 26 and projected toward the outer side of the running board body 12 and on the ground, obtaining better security of the illuminated running board 10 in service. Moreover, the light-emitting device 14, which is securely sealed, prevents the illuminated running board 10 from permeation of ambient moisture and contributes to service life of the light-emitting device 14.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. An illuminated running board for a vehicle comprising:
    a running board body adapted to be installed on a vehicle's lateral side and including a top extending in a longitudinal direction of the running board body, with the running board body further including two lateral ends spaced in the longitudinal direction, with the running board body further including an outer end portion extending in the longitudinal direction and between the two lateral ends, with the outer end portion extending downward from the top, with an accommodation space formed inside the outer end portion and extending in the longitudinal direction; and
    a light-emitting device installed inside the running board body and including at least one light guide bar and at least one illuminant, with the at least one light guide bar held in the accommodation space of the running board body and including a first plane, with the first plane facing the outer end portion to form a luminous surface, with the at least one light guide bar further including two lateral ends spaced in the longitudinal direction, with the at least one illuminant being adjacent to an end face of at least one lateral end of the at least one light guide bar and projecting light rays which are guided into the at least one light guide bar through the end face and emitted from the outer end portion of the running board body, wherein the at least one light guide bar further includes a second plane opposite to the first plane, with a U-shaped reflective piece engaged on the second plane and two side planes of the at least one light guide bar.

2. An illuminated running board for a vehicle comprising:
    a running board body adapted to be installed on a vehicle's lateral side and including a top extending in a longitudinal direction of the running board body, with the running board body further including two lateral ends spaced in the longitudinal direction, with the running board body further including an outer end portion extending in the longitudinal direction and between the two lateral ends, with the outer end portion extending downward from the top, with an accommodation space formed inside the outer end portion and extending in the longitudinal direction, wherein the outer end portion is provided with an opening extending through the outer end portion and in communication with the accommodation space, wherein at least one joint groove is defined inside the outer end portion and spaced from the accommodation space; and
    a light-emitting device installed inside the running board body and including at least one light guide bar and at least one illuminant, with the at least one light guide bar held in the accommodation space of the running board body and including a first plane, with the first plane facing the outer end portion to form a luminous surface, with the at least one light guide bar further including two lateral ends spaced in the longitudinal direction, with the at least one illuminant being adjacent to an end face of at least one lateral end of the at least one light guide bar and projecting light rays which are guided into the at least one light guide bar through the end face and emitted from the outer end portion of the running board body, with the at least one illuminant held in an illuminant holder, with the illuminant holder including at least one salient portion formed at a lateral end of illuminant holder and correspondingly inserted into the at least one joint groove in the running board body.

3. The illuminated running board according to claim 2, wherein the light-emitting device further includes a transparent tubing which covers peripheries of the at least one light guide bar.

4. The illuminated running board according to claim 3, wherein the light-emitting device further includes a translucent clamping body having two clip arms and a joint portion connecting the two clip arms, with the two clip arms clamping the transparent tubing, with the joint portion located between the first plane of the at least one light guide bar and the opening of the outer end portion.

5. The illuminated running board according to claim 2, wherein the at least one light guide bar further includes a second plane opposite to the first plane, with the second plane of the at least one light guide bar provided with a microstructure consisting of geometric dots.

6. The illuminated running board according to claim 2, wherein the outer end portion develops a curved shape, with the running board body further including a bottom extending inward from a lower end of the outer end portion and spaced from the top.

7. The illuminated running board according to claim 2, wherein the illuminant holder is made of silicone and internally provided with thermal conductivity glue or heat sinks for sealing an outer side opening of the illuminant holder.

8. The illuminated running board according to claim 1, wherein the outer end portion is provided with an opening extending through the outer end portion and in communication with the accommodation space.

9. The illuminated running board according to claim 1, wherein the light-emitting device further includes a transparent tubing which covers peripheries of the at least one light guide bar and the U-shaped reflective piece.

10. The illuminated running board according to claim 9, wherein the outer end portion is provided with an opening extending through the outer end portion and in communication with the accommodation space, wherein the light-emitting device further includes a translucent clamping body having two clip arms and a joint portion connecting the two clip arms, with the two clip arms clamping the transparent tubing, with the joint portion located between the first plane of the at least one light guide bar and the opening of the outer end portion.

11. The illuminated running board according to claim 1, wherein the first plane of the at least one light guide bar is provided with an optical diffusion film.

12. The illuminated running board according to claim 1, wherein the outer end portion develops an inwardly curved shape, with the running board body further including a bottom extending inward from a lower end of the outer end portion and spaced from the top.

13. The illuminated running board according to claim 1, wherein the second plane of the at least one light guide bar is provided with a micro-structure consisting of geometric dots.

* * * * *